(12) United States Patent  (10) Patent No.: US 8,773,634 B2
Satoh                      (45) Date of Patent:     Jul. 8, 2014

(54) METHOD FOR PRODUCING LIQUID CRYSTAL PANEL, LIQUID CRYSTAL PANEL, AND REPAIR APPARATUS

(75) Inventor: Hitoshi Satoh, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 332 days.

(21) Appl. No.: 13/376,123

(22) PCT Filed: Apr. 28, 2010

(86) PCT No.: PCT/JP2010/057583
§ 371 (c)(1),
(2), (4) Date: Dec. 2, 2011

(87) PCT Pub. No.: WO2010/140443
PCT Pub. Date: Dec. 9, 2010

(65) Prior Publication Data
US 2012/0092601 A1  Apr. 19, 2012

(30) Foreign Application Priority Data
Jun. 4, 2009 (JP) ................... 2009-135553

(51) Int. Cl.
*G02F 1/1337* (2006.01)
(52) U.S. Cl.
USPC ............................ 349/192; 349/123; 349/124
(58) Field of Classification Search
CPC . G02F 1/1337; G02F 1/13378; G02F 1/1303; G02F 1/1309
USPC ......................... 349/123, 124, 192
See application file for complete search history.

(56) References Cited

U.S. PATENT DOCUMENTS

| 7,492,437 | B2 | 2/2009 | Moon et al. | |
| 2003/0213382 | A1* | 11/2003 | Kendale et al. | 101/41 |
| 2006/0285068 | A1 | 12/2006 | Kawada et al. | |
| 2009/0021680 | A1* | 1/2009 | Onishi et al. | 349/124 |

FOREIGN PATENT DOCUMENTS

| JP | 2000-180811 | 6/2000 |
| JP | 2005-138133 | 6/2005 |
| JP | 2006-337842 | 12/2006 |
| JP | 2007-132857 | 5/2007 |
| JP | 2008-261995 | 10/2008 |
| WO | WO-2007/132586 | 11/2007 |

OTHER PUBLICATIONS

International Search Report mailed Jun. 8, 2010 directed towards counterpart application No. PCT/JP2010/057583; 2 pages.
Extended European Search Report dated Sep. 26, 2012, directed to European Application No. 10783227.1; 3 pages.

* cited by examiner

*Primary Examiner* — Michael Caley
(74) *Attorney, Agent, or Firm* — Morrison & Foerster LLP

(57) ABSTRACT

Provided is a method for producing a liquid crystal panel capable of repairing a defective portion of an alignment film more easily. Provided is a method for producing a liquid crystal panel, including the step of repairing a defective portion 50 of an alignment film 30 formed on a substrate 12 by use of a repair stamp 60 having repair ink 61 attached thereto. The step of repairing includes step (a) of locating the repair stamp 60 in a zone (repair zone) 55 including the defective portion 50; step (b) of moving the repair stamp 60 from the position (60a) at which the repair stamp 60 has been located in step (a); and step (c) of moving the repair stamp 60 again from a position (60b) to which the repair stamp 60 has been moved in step (b) to the position (60a) at which the repair stamp 60 was located in step (a).

8 Claims, 13 Drawing Sheets

(a)

(b)

(c)

METHOD FOR PRODUCING LIQUID CRYSTAL PANEL, LIQUID CRYSTAL PANEL, AND REPAIR APPARATUS

REFERENCE TO RELATED APPLICATIONS

This application is a national stage application under 35 USC 371 of International Application No. PCT/JP2010/057583, filed Apr. 28, 2010, which claims the priority of Japanese Application No. JP2009-135553, filed Jun. 4, 2009, the contents of which prior applications are incorporated herein by reference.

FIELD OF THE INVENTION

The present invention relates to a method for producing a liquid crystal panel, a liquid crystal panel, and a repair apparatus; and specifically a technology for repairing an alignment film of a liquid crystal panel.

BACKGROUND OF THE INVENTION

A liquid crystal panel, which is an element of a liquid crystal display device, has a structure in which a pair of substrates face each other while a prescribed gap is securely kept between the substrates. In the gap between the substrates, a liquid crystal layer containing liquid crystal molecules is enclosed. On surfaces of the substrates which are in contact with the liquid crystal layer, alignment films for regulating the alignment state of the liquid crystal molecules are formed (for example, Patent Document 1, etc.).

In such an alignment film, a pinhole may possibly be made locally for the following reasons.

(1) The alignment film has foreign substances mixed therein during the film formation process. By removal of the foreign substances, the alignment film is locally cut away and thus a pinhole is made.

(2) The adhesiveness of the alignment film to an underlayer (pixel electrodes, counter electrode, etc.) is locally poor and the alignment film material is repelled at such a portion during the film formation process, and thus a pinhole is made.

(3) In the case where an alignment film material for vertically aligning the liquid crystal molecules is used, the adhesiveness of the alignment film to the underlayer tends to be poor. This, together with the reason (2) above, is likely to cause a pinhole to be made.

(4) In the case where the underlayer of the alignment film is roughened to have convexed and concaved portions and the alignment state of the liquid crystal molecules is regulated by steps on a surface of the alignment film made by the convexed and concaved portions, the surface area of the underlayer on which the alignment film is formed is enlarged. This, together with the reason (2) above, is likely to cause a pinhole to be made.

When the pinhole is made for any of the above-described reasons, the image is not normally displayed at the site of the pinhole. This causes a problem that, for example, depending on the size or the position of the pinhole, the alignment film needs to be entirely peeled off and formed again, and as a result, the production cost is raised.

Patent Document 1 proposes a stamping technique of, after a pinhole is detected in an alignment film, transferring an alignment film repair agent to the pinhole. According to this stamping technique, a transfer head having the alignment film repair agent attached thereto is pressed to the pinhole to repair the alignment film. Therefore, the alignment film can be repaired easily, and the film thickness at the repaired site can be controlled easily.

CITATION LIST

Patent Document

Patent Document 1: PCT International Publication WO2007/132586

SUMMARY OF THE INVENTION

Technical Problem

The stamping technique disclosed in Patent Document 1 is effective when the pinhole locally made is smaller than the transfer portion of the transfer head. However, in actuality, when the pinhole is larger than the transfer portion of the transfer head, the alignment film repair agent needs to be transferred many times. After the transference is done once, the alignment film repair agent needs to be attached to the transfer head to perform the transference again. A container of the alignment film repair agent is provided outside the substrate on which the alignment film is formed. In the case where the substrate is a mother glass, for performing the transference many times, the transfer head needs to be moved a long distance. This decreases the throughput of the pinhole repair process.

Alignment films may be formed by a spincoat method, a spray method or an inkjet method. When the inkjet method is used to form an alignment film, there may be cases where the liquid to be applied is not jetted from the nozzle of the inkjet head. In such a case, a relatively large pinhole (defect due to poor nozzle jetting) may be possibly made. A technique for easily repairing even such a pinhole is desired.

The present invention, made in light of such situations, has a main object of providing a method for producing a liquid crystal panel capable of repairing a defect of an alignment film more easily.

Solution to the Problem

A method for producing a liquid crystal panel according to the present invention includes the steps of preparing a substrate having an alignment film formed thereon; and repairing a defective portion of the alignment film by use of a repair stamp having repair ink attached thereto. The step of repairing includes step (a) of locating the repair stamp in a zone, of the substrate, including the defective portion; step (b) of moving the repair stamp from the position at which the repair stamp has been located in step (a); and step (c) of moving the repair stamp again from a position to which the repair stamp has been moved in step (b) to the position at which the repair stamp was located in step (a).

In a preferable embodiment, the step of repairing further includes the step of moving the repair stamp to dry the repair ink applied to the defective portion.

In a preferable embodiment, an area size of a surface of the repair stamp which is contactable with the substrate is smaller than an area size of the defective portion.

In a preferable embodiment, step (c) is performed at least four times.

In a preferable embodiment, step (c) is performed eight times.

A liquid crystal panel according to the present invention includes a pair of substrates facing each other; and a liquid crystal layer located between the pair of substrates. An alignment film is formed on a surface of each of the substrates which is in contact with the liquid crystal layer; a repair layer is formed in a defective portion of the alignment film; and the repair layer is formed as a result of a repair stamp being moved from a position at which the repair stamp is first located to another position and then back to the position at which the repair stamp is first located.

A repair apparatus according to the present invention is an apparatus for repairing a defective portion of an alignment film. The repair apparatus includes a repair stamp; a moving device for moving the repair stamp; and a control device for controlling the moving device. The control device controls the movement of the repair stamp such that the moving device performs step (a) of locating the repair stamp in a zone, of the alignment film, including the defective portion; step (b) of moving the repair stamp from the position at which the repair stamp has been located in step (a); and step (c) of moving the repair stamp again from a position to which the repair stamp has been moved in step (b) to the position at which the repair stamp was located in step (a).

In a preferable embodiment, the repair apparatus further includes an inspection device for inspecting the defective portion of the alignment film.

An alignment film repair program according to the present invention is an alignment film repair program for causing a repair apparatus, including a repair stamp for repairing a defective portion of an alignment film, to repair the alignment film. The alignment film repair program causes the repair apparatus to perform step (a) of locating the repair stamp in a zone including the defective portion; step (b) of moving the repair stamp from the position at which the repair stamp has been located in step (a); and step (c) of moving the repair stamp again from a position to which the repair stamp has been moved in step (b) to the position at which the repair stamp was located in step (a).

In a preferable embodiment, the alignment film repair program causes the repair apparatus to perform steps (b) and (c) repeatedly to move the repair stamp in the zone including the defective portion.

A storage medium according to the present invention is a storage medium having the alignment film repair program stored thereon.

Advantageous Effects of Invention

According to the present invention, the repair stamp is located in a zone, of the substrate, including the defective portion, moved from the position at which the repair stamp has been located to another position and then back to the position at which the repair stamp was first located, to repair the defective portion. Therefore, as compared with the case where the repair stamp is kept away from the position at which the repair stamp was first located, the repair ink attached to the repair stamp can be efficiently used and thus a larger defective portion can be repaired. As a result, the defect of the alignment film can be repaired more easily.

DESCRIPTION OF EMBODIMENTS

Hereinafter, an embodiment of the present invention will be described with reference to the drawings. In the figures referred to below, elements having substantially the same functions are represented by the same reference signs for simplifying the explanation. The present invention is not limited to the following embodiment.

First, with reference to FIG. 1 through FIG. 3, a liquid crystal display device 100 including a liquid crystal panel 10 obtained by a production method in an embodiment according to the present invention will be described.

Figure 1:
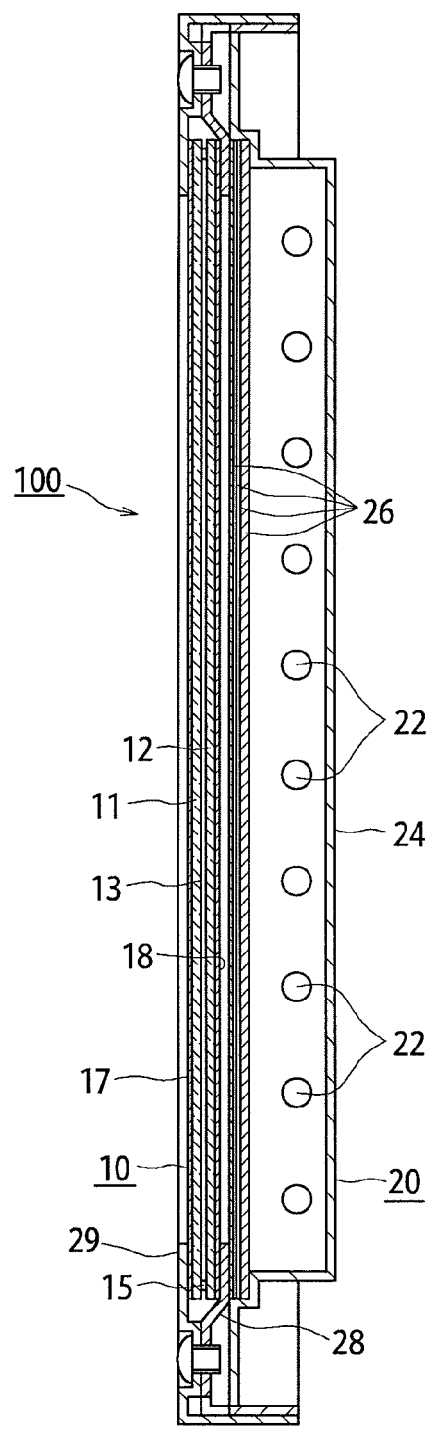
FIG. 1 is a cross-sectional view of a liquid crystal display device 100 including a liquid crystal panel 10 in an embodiment according to the present invention.

FIG. 1 schematically shows a cross-sectional structure of the liquid crystal display device 100 including the liquid crystal panel 10 in this embodiment. The liquid crystal display device 100 shown in FIG. 1 includes the liquid crystal panel 10 and a backlight device 20, which is an external light source provided on the rear side of the liquid crystal panel (lower side in FIG. 1). The liquid crystal panel 10 and the backlight device 20 are held while being assembled together by a bezel 29 provided to cover the front side of the liquid crystal panel 10.

The backlight device 20 includes a plurality of linear light sources (e.g., cold-cathode fluorescent tubes) 22 and a case 24 for accommodating the light sources 22. The case 24 has a shape of box opened toward the front side (toward the side of the liquid crystal panel 10). The light sources 22 are arranged parallel to each other in the case 24.

In the opening of the case 24, a plurality of optical sheets 26 are located while being stacked. The optical sheets 26 are, for example, a diffuser, a diffusion sheet, a lens sheet and a luminance increasing sheet which are located from the rear side sequentially in this order. In addition, the case 24 is provided with a frame 28 having a generally frame-like shape in order to hold the optical sheets 26 in the state where the optical sheets 26 are fit into the case 24.

The liquid crystal panel 10 has a generally rectangular overall shape, and includes a pair of light-transmissive substrates (glass substrates) 11 and 12. As each of the substrates 11 and 12, a substrate cut from a large mother member called "mother glass" during a production process thereof is used.

The substrates 11 and 12 are located to face each other, and a liquid crystal layer 13 is provided between the substrates 11 and 12. The liquid crystal layer 13 is formed of a liquid crystal material, optical characteristics of which change when an electric field is applied between the substrates 11 and 12. On an outer peripheral portion of each of the substrates 11 and 12, a sealant 15 is provided for enclosing the liquid crystal layer 13. A gap between the substrate 11 and the substrate 12 is securely kept by spacers (not shown) and the sealant 15. The spacers are formed of, for example, an elastically deformable resin and are particle-like (spherical). A great number of spacers are located in a dispersed state at prescribed positions in the liquid crystal layer 13. On outer surfaces of the substrates 11 and 12, polarizer plates 17 and 18 are respectively bonded.

In this embodiment, among the substrates 11 and 12, the substrate on the front side is a color filter substrate (CF substrate) 11, and the substrate on the rear side is an array substrate 12. FIG. 2 shows a part of a top surface of the array substrate 12 in enlargement. FIG. 3 shows a cross-section of a part of the substrates 11 and 12 in enlargement.

Figure 2:
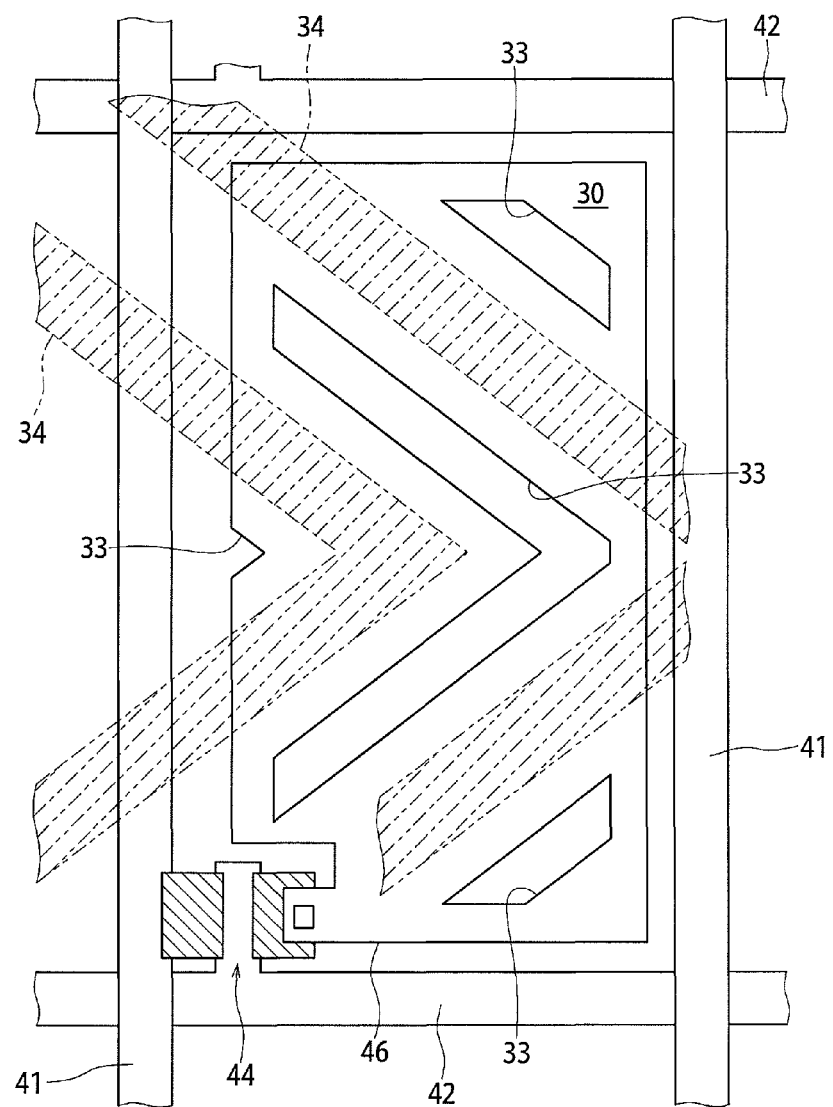
FIG. 2 is an enlarged plan view showing a part of a top surface of an array substrate 12.

As shown in FIG. 2, on the top surface of the array substrate 12 (on the side of the liquid crystal layer 13, the surface facing the CF substrate 11), a switching element (e.g., TFT) 44 and a pixel electrode 46 are provided. Source lines 41 and gate lines 42 are provided in a grid pattern so as to surround the switching device 44 and the pixel electrode 46. Each of the source lines 41 is connected to a source electrode of a corresponding switching element 44, and each of the gate lines 42 is connected to a gate electrode of a corresponding switching element 44. The pixel electrode 46 is formed of, for example, ITO (Indium Tin Oxide). The pixel electrode 46 is formed to be, for example, rectangular or square. In the example shown in FIG. 2, the pixel electrode 46 is formed to have a rectangular shape which is lengthy in the direction in which the source lines 41 extend.

Figure 3:
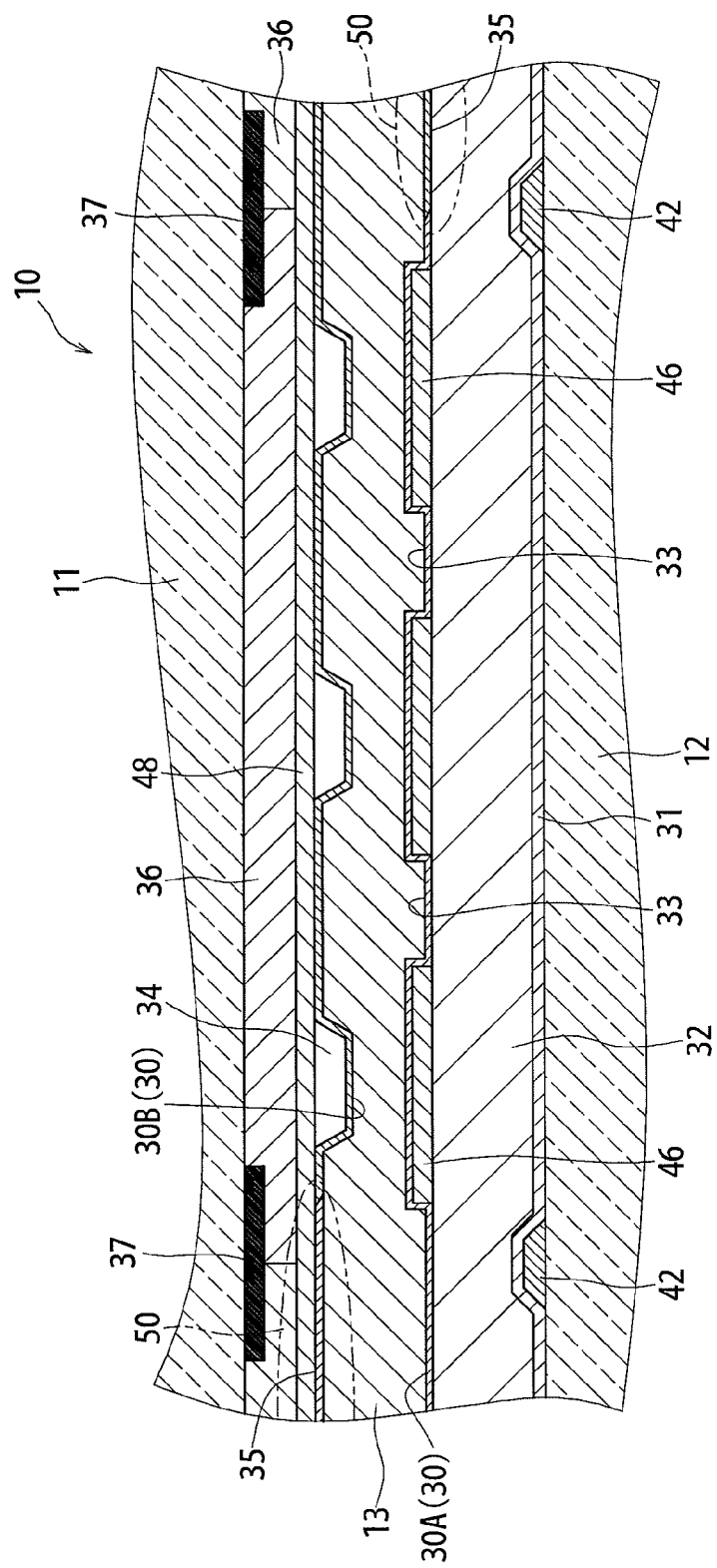
FIG. 3 is an enlarged cross-sectional view showing a part of the liquid crystal panel 10.

In this embodiment, as shown in FIG. 3, on the array substrate (specifically, on the glass substrate) 12, the gate lines 42 are formed. On the array substrate 12, an insulating layer 31 is formed so as to cover the gate lines 42. On the insulating layer 31, an insulating layer 32 is formed. On the insulating layer 32, the pixel electrode 46 is formed. There are cases where an assembly of the elements including the substrate 12, the insulating layer 32 and the pixel electrode 46, and also the elements located between these elements, are collectively referred to as the array substrate 12.

On the pixel electrode 46 and the insulating layer 32, an alignment film 30 (30A) is formed for aligning the liquid crystal molecules in the liquid crystal layer 13. In other words, the alignment film 30 (30A) is formed on the pixel electrode 46 and parts of the insulating layer 32 provided outer thereto, the parts being in contact with the liquid crystal layer 13. In this embodiment, the alignment film 30 is formed of a material which aligns the liquid crystal molecules vertically to a surface of the alignment film 30 in the absence of voltage application to the liquid crystal layer 13 (so-called vertical alignment type material). The alignment film 30 in this embodiment is formed of polyimide. The alignment film 30 has a thickness of, for example, about 100 nm to about 200 nm. In this embodiment, the pixel electrode 46 and the insulating layer 32 form an underlayer of the alignment film 30. In a liquid crystal panel adopting another stacking structure, a different layer may be an underlayer of the alignment film 30.

In this embodiment, the pixel electrode 46 (surface of the array substrate 12) has slits 33 (grooves, openings, steps).

Accordingly, the surface of the alignment film 30 formed on the pixel electrode 46 has steps. In this example, as shown in FIG. 2, the slits 33 are formed as grooves having a prescribed width. Specifically, the slits 33 are formed in the pixel electrode 46, at a central position in the longitudinal direction, in the vicinity of both of ends in the longitudinal direction, and an intermediate position between the ends. The slit 33 at the intermediate position is V-shaped as seen in a plan view. The slit 33 at the central position is located on a side edge of the pixel electrode 46 and is triangular as seen in a plan view. The slits 33 at both of the ends are linear and generally parallel to the slit 33 at the central position. The slits 33 are located generally at regular intervals.

The steps in the alignment film 30 made by the slits 33 allow the alignment state of the liquid crystal molecules to be regulated such that the liquid crystal molecules are tilted with respect to the up-down direction in FIG. 3 (direction perpendicular to the surfaces of the substrates 11 and 12). The steps made by the slits 33 can dispense with rubbing treatment on the alignment film 30. The slits 33 may have such a depth that, for example, the slits 33 reach the insulating layer 32 as shown in FIG. 3.

As shown in FIG. 3, on an inner surface of the CF substrate 11 (on the side of the liquid crystal layer 13, the surface facing the array substrate 12), color filters 36 are arranged side by side and located at positions corresponding to the pixel electrodes 46. The color filters 36 have a function of permitting light of a prescribed wavelength to transmit and absorbing light of other wavelengths. The color filters 36 in this embodiment are R (red), G (green) and B (blue) color filters 36. The color filters 36 are arranged in the order of, for example, R, G and B.

Between adjacent color filters 36 of different colors, a light shielding layer 37 (black matrix) is provided for shielding light from the adjacent color filters 36. This prevents the colors from being mixed. The light shielding layer 37 is formed in a grid pattern so as to surround each of the color filters 36.

On an inner surface of the color filters 36, a counter electrode 48 formed of, for example, ITO like the pixel electrode 46 is formed. In this embodiment, on an inner surface of the counter electrode 48, ribs 34 (convexed portions, protrusions, steps) are provided. According to the structure of this embodiment, the ribs 34 protrude from the inner surface of the counter electrode 48 toward the array substrate 12 facing the counter electrode 48, and have a lengthy shape of a prescribed width. As shown in FIG. 2, the ribs 34 are V-shaped as seen in a plan view, and are arranged in a line and formed generally in the middle between two slits 33 provided as being adjacent to each other on the array substrate 12 side. The ribs 34 are formed such that axial directions thereof are generally parallel to the directions in which the slits 33 extend.

On the inner surface of the counter electrode 48 and the ribs 34, an alignment film 30 (30B) is provided for aligning the liquid crystal molecules in the liquid crystal layer 13. In other words, the alignment film 30 (30B) is formed on the surfaces of the counter electrode 48 and the ribs 34, the surfaces being in contact with the liquid crystal layer 13. Therefore, the ribs 34 protruding from the counter electrode 48 cause the surface of the alignment film 30 (30B) to have steps. The steps allow the alignment state of the liquid crystal molecules to be regulated such that the liquid crystal molecules are tilted with respect to the up-down direction in FIG. 3 (direction perpendicular to the surfaces of the substrates 11 and 12). The steps can dispense with rubbing treatment on the alignment film 30.

In the liquid crystal panel 10, defective portions 50 may be made in the alignment films 30 (30A, 30B) during the production process thereof. In this embodiment, the defective portions 50 of the alignment films 30 are each repaired by a repair layer 35 formed of a repair ink.

Figure 4:
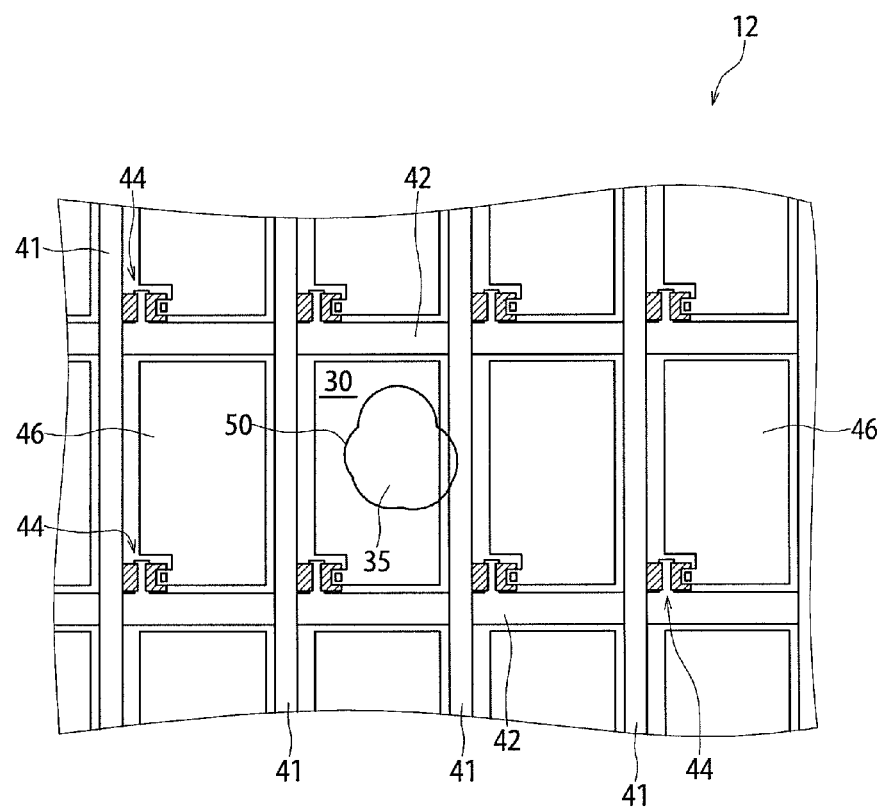
FIG. 4 is a plan view of a part of the top surface of the array substrate 12.

FIG. 4 is a plan view showing the array substrate 12 having a relatively large defective portion 50 made during the production process thereof. According to the structure of this embodiment, a repair layer 35 is formed on the defective portion 50 and thus the alignment film 30 is repaired.

Figure 5:
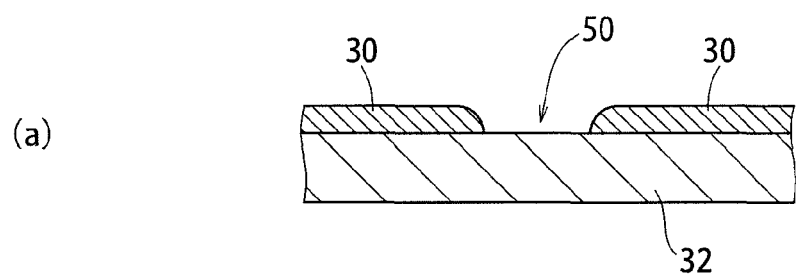
FIGS. 5(a) through 5(c) are cross-sectional views illustrating steps for forming a repair layer 35.
Figure 5:
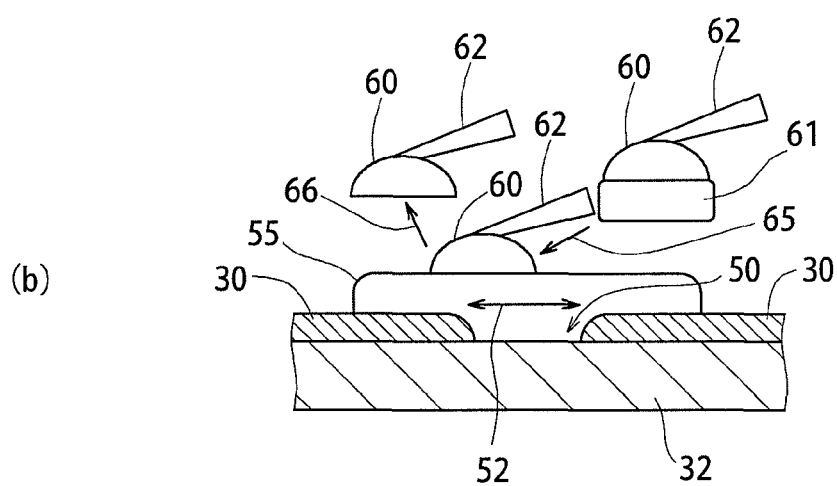
Figure 5:
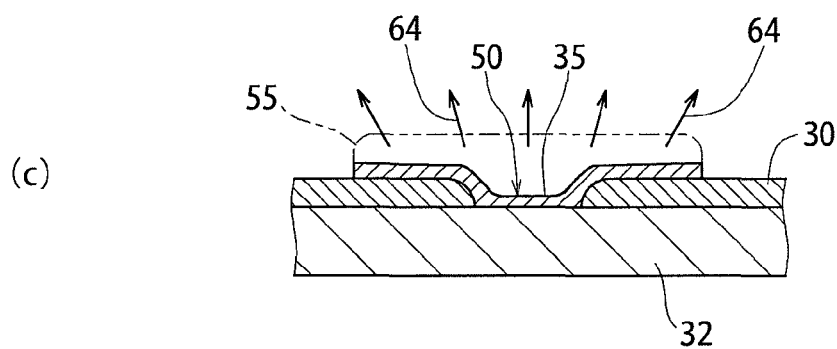

The repair layer 35 is formed as shown in FIGS. 5(a) through 5(c). FIGS. 5(a) through 5(c) are cross-sectional views showing steps for forming the repair layer 35.

First, after the formation step of the alignment film 30 is completed, as shown in FIG. 5(a), the defective portion 50 is found in the alignment film 30 by an inspection.

Next, as shown in FIG. 5(b), a zone (repair zone) 55 including the defective portion 50 found by the inspection is defined. Then, a repair stamp 60 having repair ink 61 attached thereto is put close to the repair zone 55. Specifically, the repair stamp 60 having the repair ink 61 attached to a bottom surface thereof is held by a jig 62 and moved to the repair zone 55. After this, the repair ink 61 attached to the repair stamp 60 is put into contact with the defective portion 50 (arrow 65), and then the repair stamp 60 is moved (arrow 52) to apply the repair ink 61 to the defective portion 50. When the application of the repair ink 61 is completed, the repair stamp 60 is moved away from the repair zone 55 (arrow 66).

Then, as shown in FIG. 5(c), the repair ink 61 applied to the repair zone 55 is dried (see arrow 64) to form the repair layer 35. When, for example, the repair ink 61 is an ultraviolet-curable resin, the repair layer 35 is cured by being irradiated with ultraviolet. Thus, the repair of the defective portion 50 of the alignment film 30 is completed. Here, the defective portion 50 of the alignment film 30 (30A) on the insulating layer 32 of the array substrate 12 is described as an example. For the alignment film 30 (30B) of the CF substrate 11, substantially the same treatment is performed.

Figure 6:
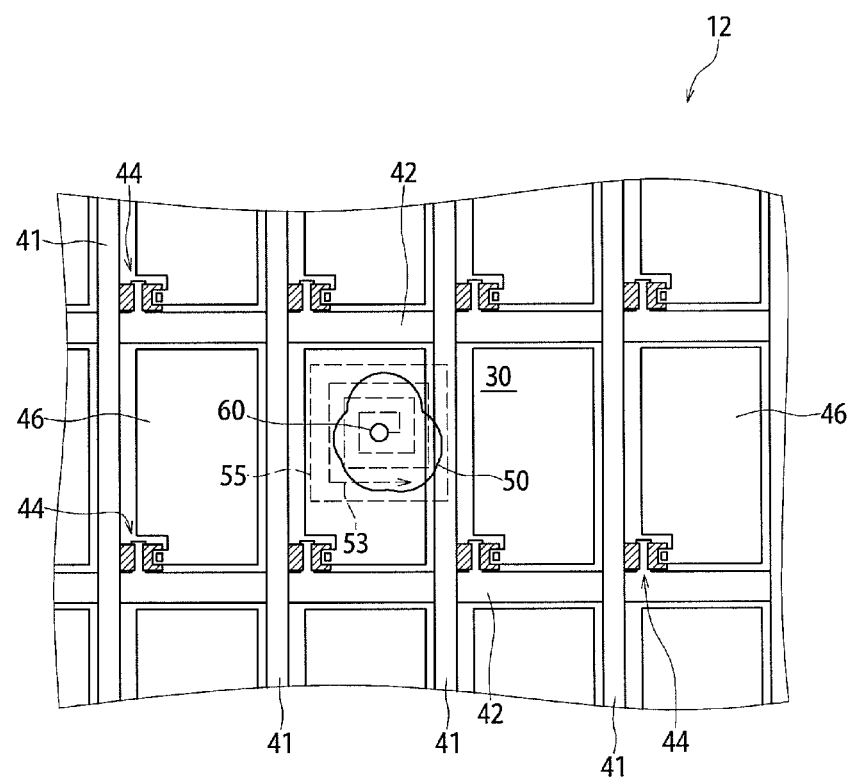
FIG. 6 is a plan view of the array substrate 12 illustrating a repairing technique investigated by the present inventor.

FIG. 6 is a plan view of the array substrate 12 illustrating a repairing technique investigated by the present inventor. FIG. 6 shows how the repair stamp 60 is moved in the repair zone 55 in the array substrate 12 having the defective portion 50 to do the repair.

According to the technique shown in FIG. 6, the repair stamp 60 is located at a central position of the repair zone 55, and then is moved in a whirlpool manner (arrow 53) to repair the defective portion 50 in the repair zone 55. This technique works well in the case where the defective portion 50 is small and the area size of the repair zone 55 is relatively small. However, it has been found by the investigation of the present inventor that in the case where the repair zone 55 is relatively large as shown in FIG. 6, when the repair stamp 60 is moved in a whirlpool manner (arrow 53), a phenomenon that the repair stamp 60 becomes out of ink (a sufficient amount of repair ink is not left) occurs.

Specifically, when the repair stamp 60 is moved as represented by arrow 53, the repair ink can be applied to a zone which is about six times the area size of the repair stamp 60, but it is actually difficult to apply the repair ink to a larger area. Therefore, for repairing the repair zone 55 having a relatively large area size, each time the repair stamp 60 becomes out of the repair ink, the repair stamp 60 needs to be supplemented with repair ink. A container of the repair ink is provided outside a substrate stage for holding the substrate 12. Therefore, once the repair stamp 60 becomes out of the repair ink, the throughput of the repair step is significantly lowered. Especially when the substrate 12 is a mother glass, the moving distance or the moving time required for supplementing the repair stamp 60 with the repair ink is significant.

Figure 7:
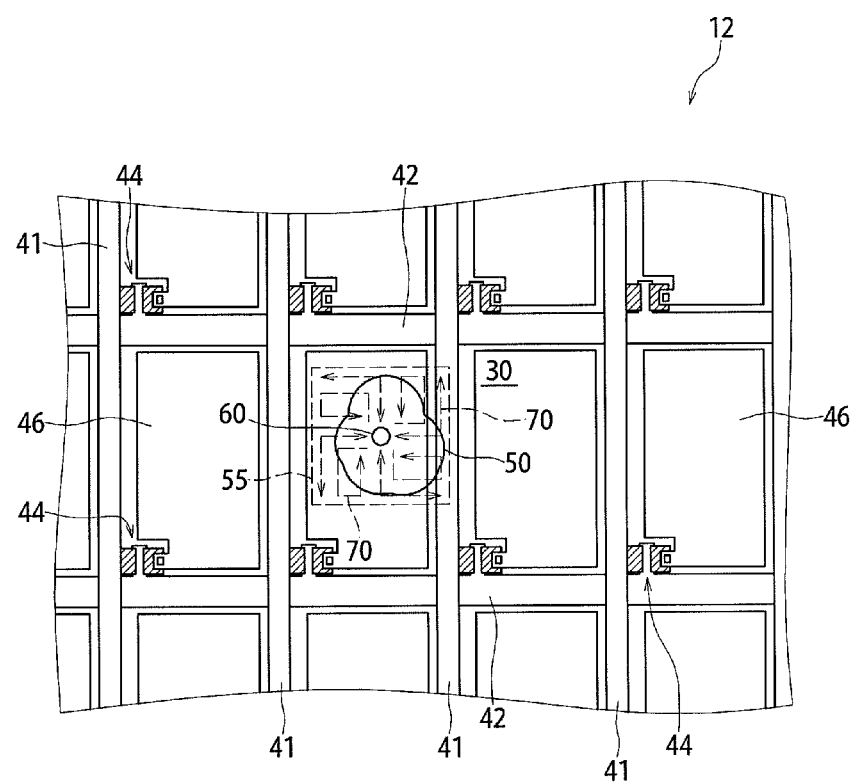
FIG. 7 is a plan view of the array substrate 12 illustrating a repairing technique in an embodiment according to the present invention.

As a result of performing actively studies to solve the problem of the technique shown in FIG. 6, the present inventor conceived a technique shown in FIG. 7. According to the technique shown in FIG. 7 in this embodiment, after being located at a central position of the repair zone 55, the repair stamp 60 is moved as represented by arrow 70 and then put back to the first position (central position), to repair the defective portion 50 in the repair zone 55. While such a movement of the repair stamp 60 (arrow 70) is repeated, the repair ink is applied to the repair zone 55.

Use of the technique shown in FIG. 7 in this embodiment allows the repair ink to be applied to a larger area than the technique shown in FIG. 6. A reason for this is that a reservoir of ink remains at the position at which the repair stamp 60 was first located (e.g., the central position) and therefore, the repair stamp 60 can be substantially supplemented with the repair ink when being moved back to the position at which the repair stamp 60 was first located. According to this novel technique conceived by the present inventor, the repair ink can be applied to a larger repair zone 55 than the technique shown in FIG. 6.

The sizes of the repair stamp 60, the repair zone 55 and the like shown in FIG. 7 are, for example, as follows. The diameter of the repair stamp 60 is, for example, 150 μm to 300 μm. The area size of the repair stamp 60 is, for example, 0.017 to 0.07 mm$^2$. The bottom surface of the repair stamp 60 is circular, but may be of any other shape (e.g., rectangular, square, etc.) instead of circular. The repair stamp 60 is formed of, for example, a UV-curable resin. A UV-curable resin is molded and then cured by being irradiated with UV to form the repair stamp 60. The area size of the repair zone 55 is, for example, 0.017 mm$^2$ (diameter: 150 μm) to 2.25 mm$^2$ (1.5 mm square). The repair zone 55 may be determined in accordance with the defective portion 50, and can be defined based on, for example, the X coordinate and the Y coordinate of the outer circumference of the defective portion 50. In this embodiment, the area size of the bottom surface of the repair stamp 60 is smaller than the area size of the defective portion 50 or the area size of the repair zone 55, and the repair zone 55 including the defective portion 50 is repaired by moving the repair stamp 60. Needless to say, the repair stamp 60 in this embodiment is usable to repair the defective portion 50 or the repair zone 55 smaller than the area size of the bottom surface of the repair stamp 60.

Figure 8A:
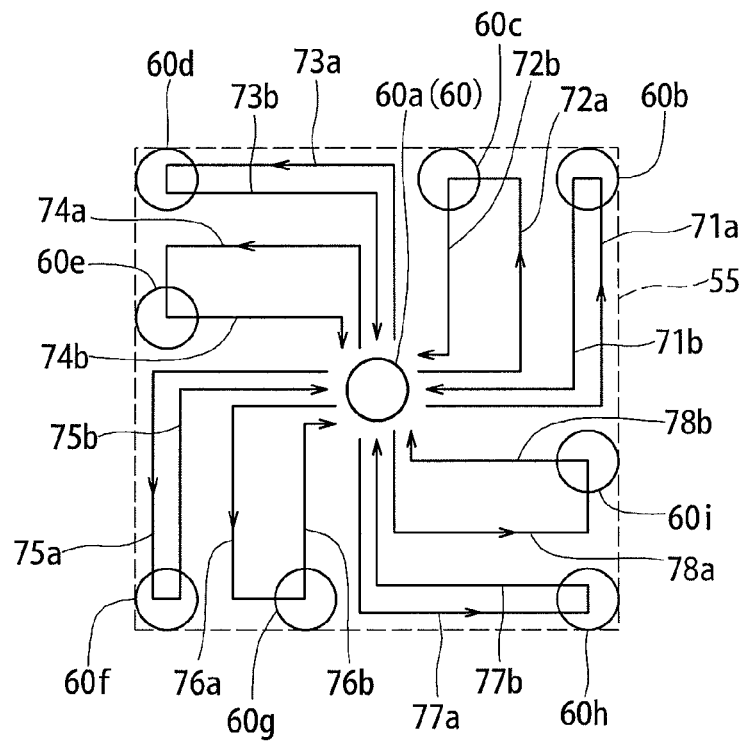
FIG. 8A is a plan view illustrating a movement of a repair stamp 60.
Figure 8B:
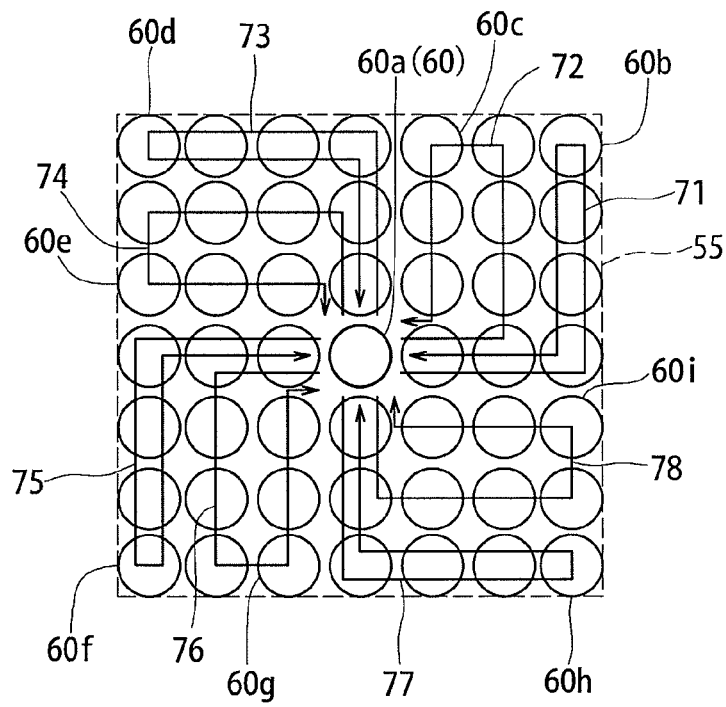
FIG. 8B is a plan view illustrating the movement of the repair stamp 60.

With reference to FIGS. 8A and 8B, the method for repairing the alignment film 30 in this embodiment will be further described. FIGS. 8A and 8B illustrate a technique for moving the repair stamp 60 in the repair zone 55.

First, as shown in FIG. 8A, the repair stamp 60 is located at a central position of the repair zone 55. The central position at which the repair stamp 60 is located, i.e., the position of the repair stamp 60a is the start position. In the example shown in FIG. 8A, the repair stamp 60 is moved from the position of the repair stamp 60a as represented by arrow 71a to a position of the repair stamp 60b. Next, the repair stamp 60 is moved from the position of the repair stamp 60b as represented by arrow 71b back to the position of the repair stamp 60a. By moving the repair stamp 60 from the first position (60a) to another position (60b) and then back to the first position (60a), the ink reservoir at the first position (60a) can be used and thus the area to which the ink can be applied by the repair stamp 60 can be enlarged.

Next, the repair stamp 60 is moved from the first position of the repair stamp 60a as represented by arrow 72a to a position of the repair stamp 60c. Then, the repair stamp 60 is moved from the position of the repair stamp 60c as represented by arrow 72b back to the position of the repair stamp 60a again.

After this, such a movement is repeated. Simply describing, the repair stamp 60 is moved from the position of the repair stamp 60a to a position of the repair stamp 60d (arrow 73a), and then is moved back to the position of the repair stamp 60a (arrow 73b). Similarly, the repair stamp 60 is moved from the position of the repair stamp 60a to positions of the repair stamps 60e, 60f, 60g, 60h and 60i (arrows 74a, 75a, 76a, 77a and 78a) and then back to the position of the repair stamp 60a (arrows 74b, 75b, 76b, 77b and 78b).

In this manner, the repair zone 55 can be repaired by use of the repair stamp 60. FIG. 8B shows the track of the repair stamp 60 more easily to see. In the example shown in FIGS. 8A and 8B, the repair stamp 60 returns to the first position (60a) eight times as represented by arrows 71 through 78 to apply the ink to the repair zone 55. According to the technique shown in FIG. 6, the repair ink can be applied to a zone only about six times the area size of the repair stamp 60; whereas according to the technique shown in FIGS. 8A and 8B, the repair ink can be applied to a much larger area (e.g., about 40 times or larger). After the repair step is performed on the alignment film 30, the remaining process for producing the liquid crystal panel is continued.

Figure 9:
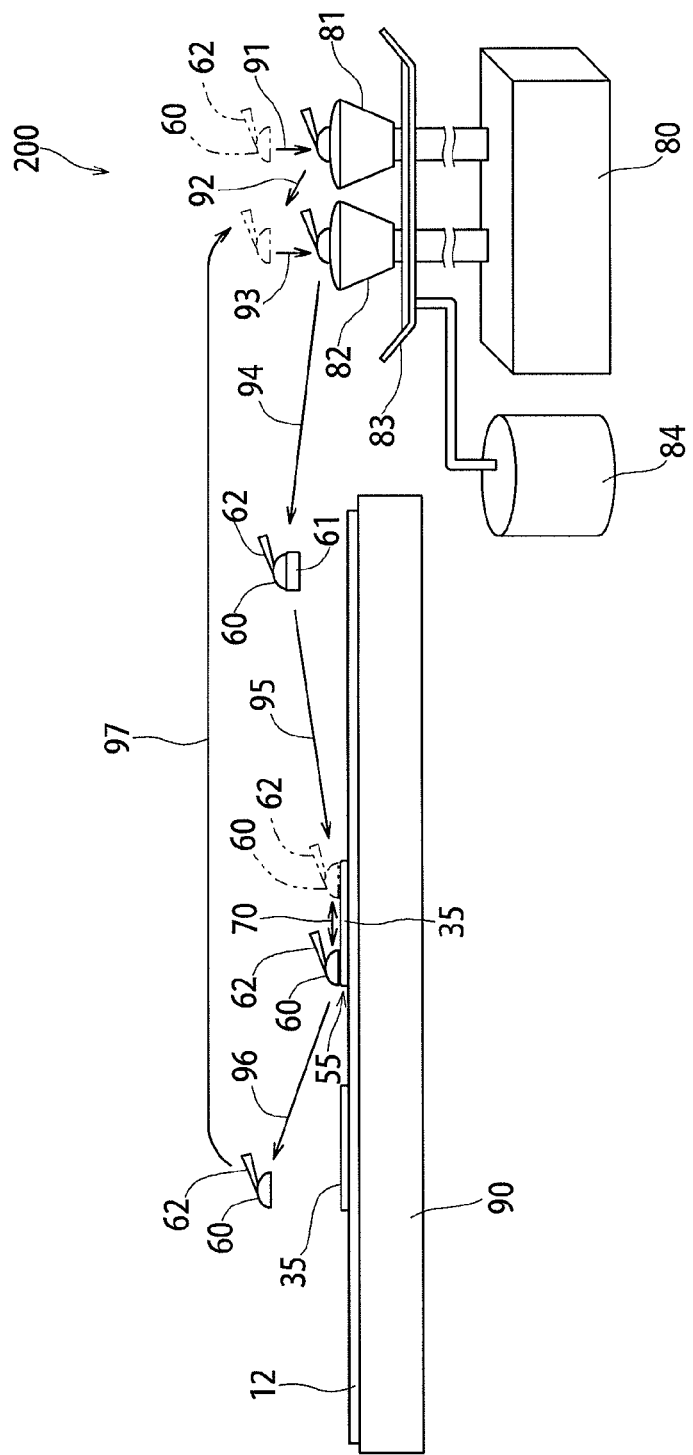
FIG. 9 schematically shows a structure of a repair apparatus 200 in an embodiment according to the present invention.
Figure 10:
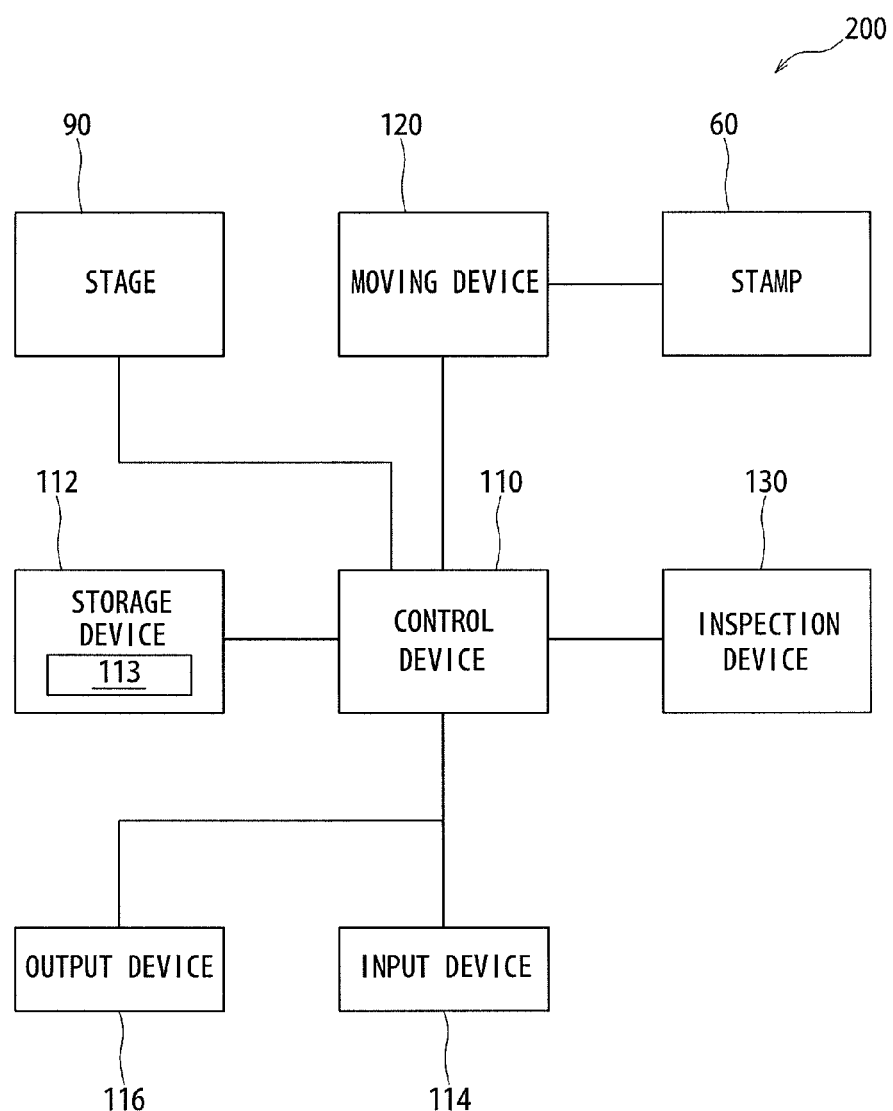
FIG. 10 is a block diagram showing the structure of the repair apparatus 200 in an embodiment according to the present invention.

FIG. 9 schematically shows a structure of a repair apparatus 200 in this embodiment. The repair apparatus 200 in this embodiment is for repairing the defective portion 50 of the alignment film 30. The repair apparatus 200 can perform the above-described repair step. FIG. 10 is a block diagram showing the structure of the repair apparatus 200.

The repair apparatus 200 in this embodiment includes the repair stamp 60 having the repair ink 61 attached thereto, a moving device 120 for moving the repair stamp 60, and a control device 110 for controlling the moving device 120. In FIG. 9, the moving device 120 and the control device 110 are omitted.

In the example of structure shown in FIG. 9, a supply box 80 for supplying the repair ink 61 and a stage 90 for holding the substrate (array substrate) 12 having the repair zone 55 are provided. On the stage 90, a glass substrate having the alignment film 30 formed thereon is located as the substrate 12. The alignment film 30 in this embodiment is formed by an inkjet method. The substrate 12 may be a mother glass before being cut into a size of a liquid crystal panel, or a glass plate after being cut into the size of the liquid crystal panel. The array substrate 12 is an example, and the CF substrate 11 may be located instead of the array substrate 12.

The supply box 80 is provided with a washing section 81 for washing the repair stamp 60 and an ink supply section 82 for supplying the repair ink 61. In the case where, for example, the alignment film 30 is formed of polyimide, the repair ink 61 is a solution obtained by diluting polyimide for inkjet at a prescribed ratio. Below the washing section 81 and the ink supply section 82, a waste fluid receiving section 83 is provided. The waste fluid receiving section 83 is coupled to a waste fluid recovery tank 84.

The repair stamp 60 is connected to a stamp jig 62. The stamp jig 62 is connected to the moving device 120. The stamp 60 is moved by the moving device 120 controlled by the control device 110 and performs a prescribed operation. The stage 90 for holding the substrate 12 can be controlled by the control device 110. The stage 90 and the stamp 60 may be moved in association with each other by the control device 110. Specifically, for moving the stamp 60, the stamp 60 and the stage 90 may be associated with each other such that the stamp 60 is fixed and the stage 90 is moved instead.

As shown in FIG. 10, the control device 110 in this embodiment is connected to a storage device 112, an input device 114 and an output device 116. The control device 110 is formed of, for example, a CPU (central processing unit). The storage device 112 is a hard disc, a semiconductor memory, an optical disc (CD, DVD, etc.), a magneto-optical disc (MO) or the like. The input device 114 is, for example, a keyboard, a mouse, a touch panel or the like. The output device 116 is a display device (liquid crystal display, CRT, organic EL display, etc.) or a printing device (laser printer, etc.). The control device 110, the storage device 112, the input device 114 and the output device 116 can be constructed by a personal computer (PC).

The storage device 112 connected to the control device 110 has an alignment film repair program 113 stored thereon. The alignment film repair program 113 is a program for controlling the operation of the repair apparatus 200, and includes a program for controlling the movement of the repair stamp 60. The alignment film repair program 113 in this embodiment causes the repair apparatus 200 to execute step (a) of locating the repair stamp 60 in the repair zone 55, step (b) of moving the repair stamp 60 from the position at which the repair stamp 60 has been located in step (a), and step (c) of moving the repair stamp 60 again from a position to which the repair stamp 60 has been moved in step (b) to the position at which the repair stamp 60 was located in step (a). An example of the steps (a) through (c) is as described above with reference to FIG. 8A.

The repair apparatus 200 in this embodiment includes an inspection device 130 for inspecting the defective portion 50 of the alignment film 30. The inspection device 130 is connected to the control device 110. Data on the defective portion 50 detected by the inspection device 130 is output to the control device 110 and the storage device 112. The inspection device 130 is formed of an imaging element (e.g., CCD, CMOS image sensor). The inspection device 130 also includes software for detecting the defective portion 50 from the image data obtained by the imaging element, but this software may be stored on the storage device 112. The processing of defining the repair zone 55 from the data on the defective portion 50 can be performed by the control device 110 or the inspection device 130. The specific structure of the inspection device 130 is not limited as long as the inspection device 130 has a function of detecting the defective portion 50 of the alignment film 30, and any preferable structure may be adopted for the inspection device 130.

The connection between the elements of the repair apparatus 200 (control device 110, etc.) in this embodiment is not limited to an electric connection and may be, for example, wireless connection, optical connection or the like. The control device 110 and the storage device 112 may be integral with each other, and the input device 114 and the output device 116 may be integral with each other (e.g., as a touch panel display). The connection may be partially made via the Internet. For example, the control device 110 and the storage device 112 may be connected to each other via the Internet, so that a hard disc or the like in a server located away from the control device 110 can be used as the storage device 112.

The repair operation can be performed by use of the repair apparatus 200 in this embodiment as follows. As described above, the repair stamp 60 is moved by the moving device 120 controlled by the control device 110. The moving device 120 in this embodiment can move the repair stamp 60 in an X direction, a Y direction and a Z direction.

As shown in FIG. 9, the bottom surface of the repair stamp 60 is put into contact with the washing section 81 (see arrow 91) to wash the repair stamp 60. The washing section 81 contains a washing solution (e.g., N-methylpyrrolidone). Then, the washed repair stamp 60 is moved (see arrow 92), and the bottom surface of the repair stamp 60 is put into contact with the ink supply section 82 (see arrow 93). As a result, the repair ink 61 is attached to the repair stamp 60.

Next, the repair stamp 60 having the repair ink 61 attached thereto is moved to be located above the stage 90 (see arrow 94). Then, the repair stamp 60 is moved to the repair zone 55 of the substrate 12 (arrow 95). At this position, the repair step is performed (arrow 70) to form the repair layer 35. An example of the repair step is as described above with reference to FIG. 8A.

Then, the repair stamp 60 out of the repair ink 61 is moved (see arrow 96) to be returned to the ink supply section 82 (see arrow 97) for the next cycle of repair step. For starting the next cycle of repair step, the repair stamp 60 is supplemented with the repair ink 61 by the ink supply section 82 (see arrow 93), and the same processing is performed again.

Figure 11:
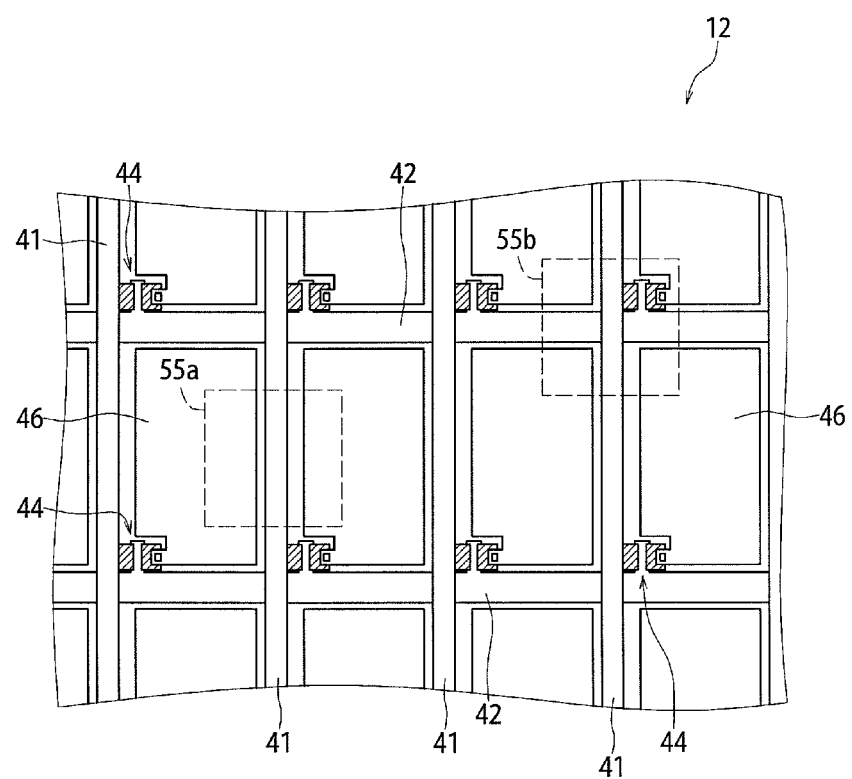
FIG. 11 is a plan view of a part of the top surface of the array substrate 12 including a repair zone.

In an example shown in, for example, FIG. 11, there are two repair zones 55 (55a and 55b) on the substrate 12. Therefore, one cycle of repair step can be performed for the repair zone 55a, and another cycle of repair step can be performed for the repair zone 55b. According to the technique shown in FIG. 6, the supplementation of the repair ink 61 needs to be done many times even for repairing one repair zone 55 and therefore the repair step is very time-consuming. As compared with this, the repair step in this embodiment can be completed within a shorter time.

Figure 12:
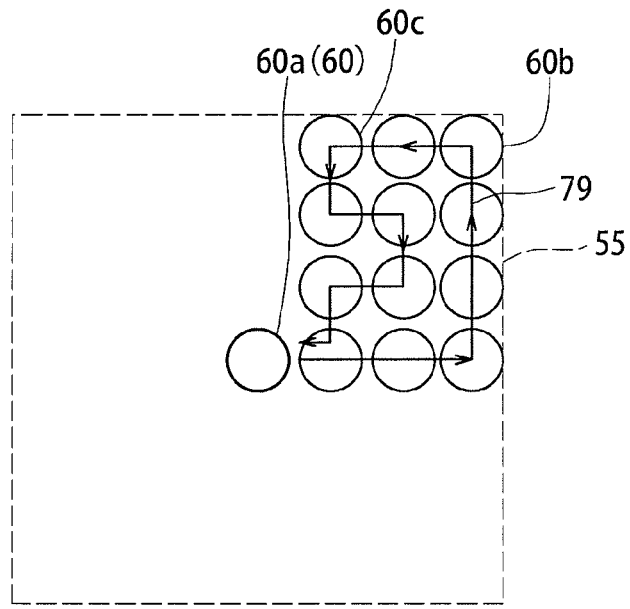
FIG. 12 is a plan view illustrating a movement of the repair stamp 60.

According to the repair step shown in FIGS. 8A and 8B, the repair stamp 60 is moved to be returned to the first position (60a) eight times. The present invention is not limited to this. Depending on the repair ink 61 attached to the repair stamp 60, the repair stamp 60 may be returned, for example, four times as shown in FIG. 12 in order to apply the repair ink to the entire repair zone 55, instead of eight times. In the example shown in FIG. 12, the repair ink is applied to a zone of ¼ at the upper right corner. In this example, the repair stamp 60 is moved, as represented by arrow 79, from 60a to 60b to 60c and then back to 60a.

Figure 13:
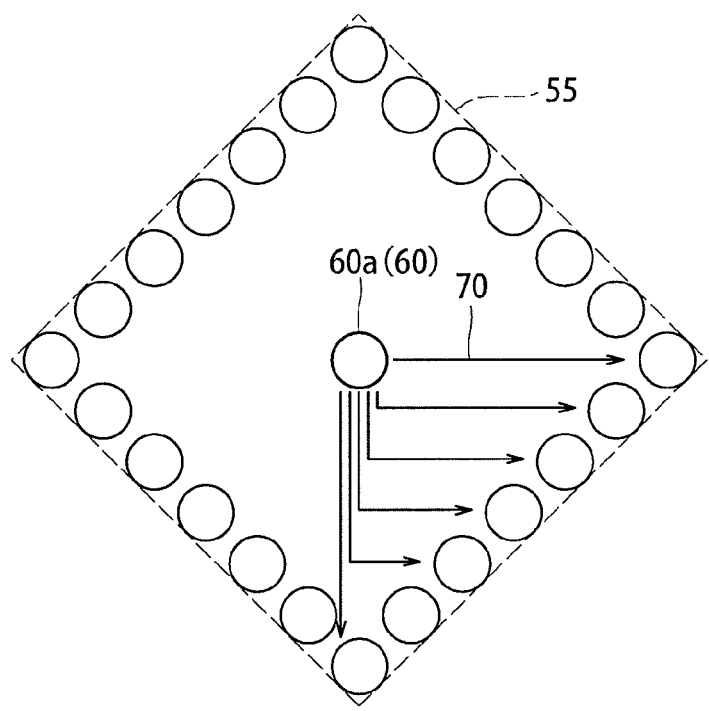
FIG. 13 is a plan view illustrating a movement of the repair stamp 60.
Figure 14:
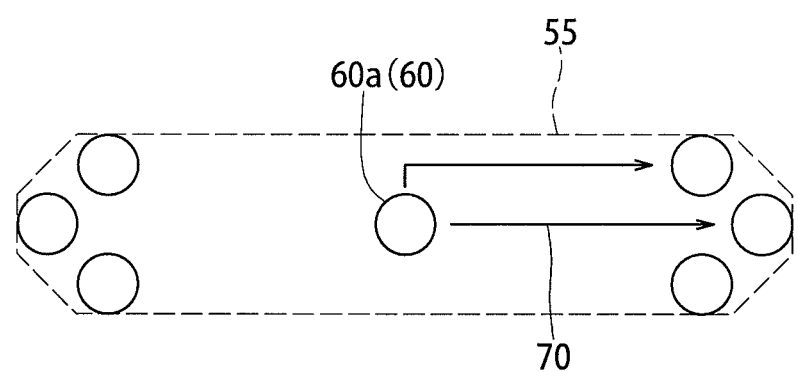
FIG. 14 is a plan view illustrating a movement of the repair stamp 60.

In addition, the shape of the repair zone 55 is not limited to square as shown in FIG. 8A, and may be determined in accordance with the shape of the defective portion 50. In FIG. 13, the repair zone 55 is diamond-shaped, and the repair step (arrow 70) is performed by use of the repair stamp 60 in such a repair zone 55. In FIG. 14, the repair zone 55 has a lengthy shape. For each repair zone 55, the moving route of the repair stamp 60, the number of times the repair stamp 60 is returned to the first position (60a), and the like may be appropriately determined. Furthermore, a plurality of types of alignment film repair programs 113 can be stored on the storage device 112 in accordance with the shapes of the repair zones 55. The alignment film repair program 113 in this embodiment may be provided as being stored on the storage device 112 and also as being stored on a storage medium (e.g., optical disc, hard disc, semiconductor memory, etc.). Alternatively, the alignment film repair program 113 may be provided via the Internet as being on a carrier wave from a server which has the alignment film repair program 113 stored thereon.

So far, the present invention has been described by way of a preferable embodiment. The above descriptions do not limit the present invention, and the present invention can be modified in any of various forms.

For example, FIG. 2 and FIG. 3 show a structure in which the slits 33 and the ribs 34 are formed. The technology of the embodiment according to the present invention is applicable to a structure with no slits 33 or ribs 34. The technology of the embodiment according to the present invention is applicable to repair the alignment film 30 of a liquid crystal panel in which the liquid crystal molecules contained in the liquid crystal layer 13 are aligned vertically, and is applicable also to repair the alignment film 30 of a liquid crystal panel of any other type than the vertical alignment type. The repair step of this embodiment is applicable regardless of whether the alignment film 30 is formed by a spincoat method, a spray method or an inkjet method. The array substrate 12 and the CF substrate 11 are formed of glass in the above, but the technology of the embodiment according to the present invention is also applicable to any other type of substrate (e.g., resin substrate). In addition, the structure of the backlight device 20 of the liquid crystal display device 100 is not limited to being of a full-array type shown in FIG. 1, and may be of any other type (e.g., edge-lit type). The backlight device 20 is not limited to being of a type including linear light sources, and may be of any other type (e.g., including LED light sources).

INDUSTRIAL APPLICABILITY

According to the present invention, a method for producing a liquid crystal panel capable of repairing a defective portion of an alignment film more easily can be provided.

DESCRIPTION OF REFERENCE CHARACTERS

10 Liquid crystal panel
11 CF substrate
12 Array substrate
13 Liquid crystal layer
15 Sealant
17, 18 Polarizer plate
20 Backlight device
22 Linear light source
24 Case
26 Optical sheet
28 Frame
29 Bezel
30 Alignment film
31 Insulating layer
32 Insulating layer
33 Slit
34 Rib
35 Repair layer
36 Color filter
37 Light shielding layer (black matrix)
41 Source line
42 Gate line
44 Switching element
46 Pixel electrode
48 Counter electrode
50 Defective portion
55 Repair zone
60 Repair stamp
61 Repair ink
62 Stamp jig
80 Supply box
81 Washing section
82 Ink supply section
83 Waste fluid receiving section
84 Waste fluid recovery tank
90 Stage
100 Liquid crystal display device
110 Control device
112 Storage device
113 Alignment film repair program
114 Input device
116 Output device
120 Moving device
130 Inspection device
200 Repair apparatus

The invention claimed is:

1. A method for producing a liquid crystal panel, comprising the steps of:
    preparing a substrate having an alignment film formed thereon; and
    repairing a defective portion of the alignment film by use of a repair stamp having repair ink attached thereto;
    wherein the step of repairing includes,
        step (a) of locating the repair stamp on a position in a zone of the substrate, including the defective portion,
        step (b) of moving the repair stamp, while keeping the repair stamp in contact with the zone of the substrate, from the position on which the repair stamp has been located in step (a) to another position of the zone of the substrate, and
        step (c) of moving the repair stamp again, while keeping the repair stamp in contact with the zone of the substrate, from the another position to which the repair stamp has been moved in step (b) to the position on which the repair stamp was located in step (a).

2. The method for producing a liquid crystal panel of claim 1, wherein the step of repairing further includes the step of moving the repair stamp to dry the repair ink applied to the defective portion.

3. The method for producing a liquid crystal panel of claim 1, wherein an area size of a surface of the repair stamp which is contactable with the substrate is smaller than an area size of the defective portion.

4. The method for producing a liquid crystal panel of claim 1, wherein step (c) is performed at least four times.

5. The method for producing a liquid crystal panel of claim 4, wherein step (c) is performed eight times.

6. A liquid crystal panel, comprising:
    a pair of substrates facing each other; and
    a liquid crystal layer located between the pair of substrates,
    wherein an alignment film is formed on a surface of each of the substrates which is in contact with the liquid crystal layer
    a repair layer is formed on a defective portion of the alignment film, and
    the repair layer is formed as a result of a repair stamp being moved, while being kept in contact with one of the substrates, from a position on which the repair stamp is first located to another position and then back to the position on which the repair stamp is first located.

7. A repair apparatus for repairing a defective portion of an alignment film, the repair apparatus comprising:
    a repair stamp;
    a moving device for moving the repair stamp; and
    a control device for controlling the moving device;
    wherein the control device controls movement of the repair stamp such that the moving device performs,
        step (a) of locating the repair stamp on a position in a zone of the alignment film, including the defective portion,
        step (b) of moving the repair stamp, while keeping the repair stamp in contact with the zone of the alignment film, from the position on which the repair stamp has been located in step (a) to another position of the zone of the alignment film, and
        step (c) of moving the repair stamp again, while keeping the repair stamp in contact with the zone of the alignment film, from the another position to which the repair stamp has been moved in step (b) to the position on which the repair stamp was located in step (a).

8. The repair apparatus of claim 7, further comprising an inspection device for inspecting the defective portion of the alignment film.

* * * * *